United States Patent Office 3,585,043
Patented June 15, 1971

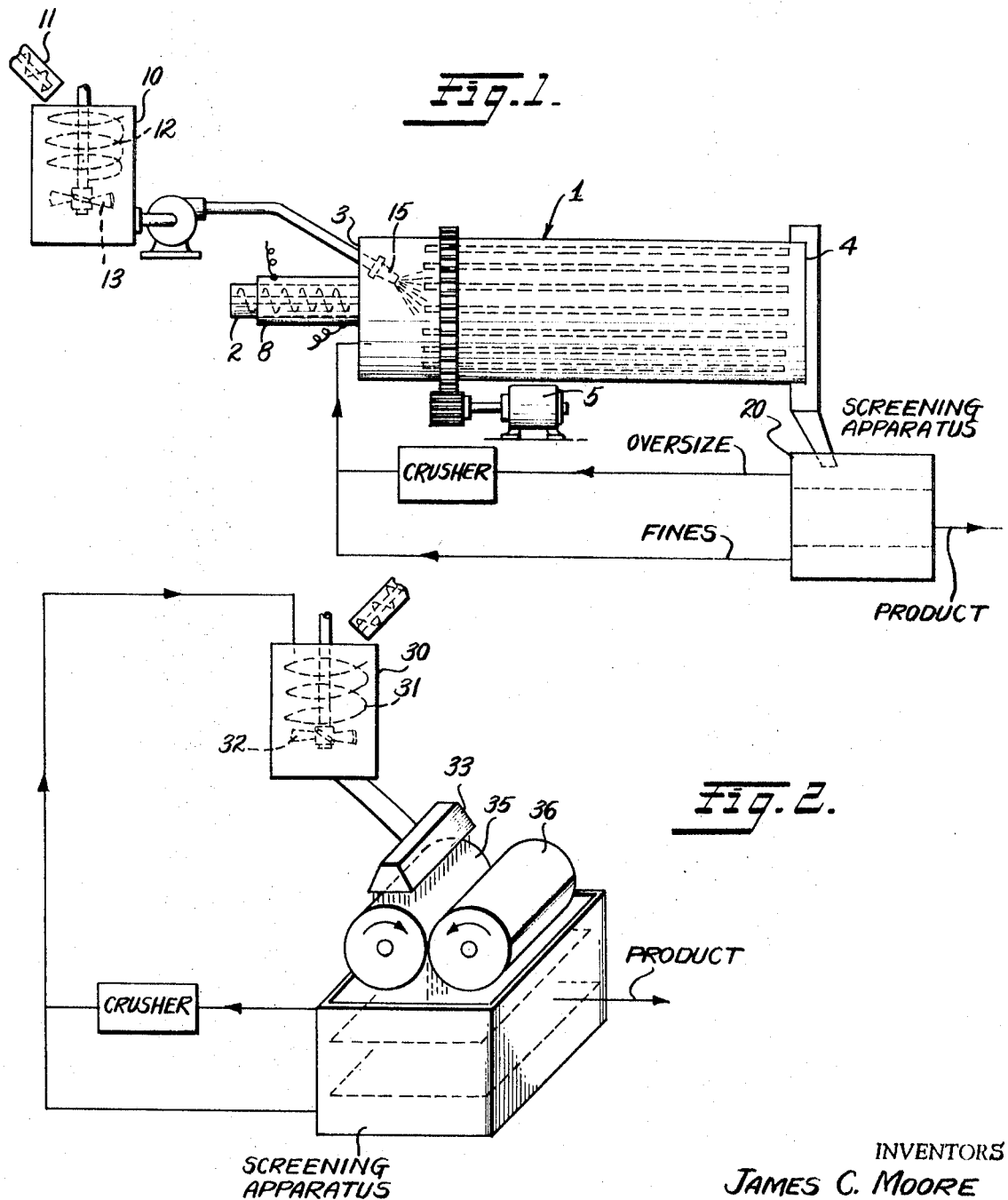

3,585,043
METHOD FOR PREPARING A HOMOGENOUS SILAGE ADDITIVE
James C. Moore and Andrew B. Funk, Memphis, Tenn., assignors to W. R. Grace & Co., New York, N.Y.
Filed Sept. 18, 1968, Ser. No. 760,407
Int. Cl. A23k 3/03
U.S. Cl. 99—8                                                      3 Claims

ABSTRACT OF THE DISCLOSURE

A homogeneous, free-flowing urea composition which has particular utility as a silage additive and an improved process for preparing same. Urea and one or more desired additives are intimately mixed and preheated to a temperature approaching the melting point of urea. The mixture is agitated and uniformly coated with molten urea. The coated particles are cooled and the resulting granules sized. In a second embodiment, the urea-additive mixture is heated to form a molten mass which is thereafter allowed to cool and solidify in a physical form suitable for grinding and sizing.

---

This invention relates to a silage additive and to a process for preparing same. More particularly, the invention relates to an improved process for preparing a substantially free-flowing and non-caking particulate urea which when combined with one or more nutrients has particular utility as a silage additive.

In recent years, it has become a generally accepted practice to treat silage with various chemicals in order to control the character of fermentation occurring on storage in silos, etc. In this regard, it has more recently been discovered that the use of urea is particularly advantageous in that it serves in controlling the fermentation as well as additionally providing increased nutritive value to the treated silage.

As is well known in the art, however, urea whether marketed in the form of crystals or prills has a great tendency to cake and form a rigid mass when stored for any significant period of time. Thus the ultimate consumer must crush or otherwise break up this mass before the urea can be used for its intended purposes. As should be readily apparent, the caking tendencies of urea necessitates the expenditure of much time and labor in order to render the material suitable for even distribution over the silage. Additionally, when the material (urea) is combined with one or more desired nutrients (e.g., phosphorus) the materials tend to segregate during handling and storage, thus requiring additional time and labor in remixing the solids to form a homogeneous mixture.

Various methods have been proposed for avoiding the above noted segregating and related problems. One prior proposal involves melting the particulate urea and spraying air into a small stream of the molten urea mass to form small uniform pellets. Other proposals involve the addition of so-called conditioning agents. Though many such proposals have been made, none has proved entirely satisfactory. Thus, the pellets, formed by spraying air into the small stream of molten urea, have been found to be weak and readily disintegratable. The use of conditioning agents results in the introduction of relatively large quantities of insoluble impurities (e.g., clay) into the urea.

It is accordingly, a general object of this invention to provide a urea containing silage additive which is free-flowing and is not subject to the aforementioned disadvantages.

Another and more particular object is to provide a process for preparing particulate urea having greatly reduced tendency to cake.

A further object is to provide a silage additive comprising urea, calcium, phosphorus, trace minerals and vitamins, which is homogeneous in the sense that each increment of the additive contains approximately the same amount of urea, calcium phosphorus, trace minerals and vitamins.

Yet another object is to provide a process for preparing a homogeneous mixture having no segregating tendencies during handling and storage.

A still further object is to provide a homogeneous solid material comprising urea and one or more desired nutrients, which when added to corn, hay, and other materials at the time of ensiling will enhance the keeping qualities and feed value of the silage.

The manner in which the foregoing and other objects are achieved in accordance with the present invention will be better understood in view of the following detailed description and accompanying drawing, which forms a part of the specification and wherein:

FIG. 1 is a diagrammatic illustration, shown in elevation, of a suitable arrangement of apparatus for carrying out a first method embodiment of the invention.

FIG. 2 is a diagrammatic illustration, of a suitable arrangement of apparatus for carrying out a second method embodiment of the present invention.

Stated broadly, the present invention is based on the discovery that a substantially non-caking and free-flowing particulate urea, which may contain one or more desired additives, can be prepared by subjecting urea to a temperature above the melting point to form a molten mass, and thereafter allowing the melt to cool and solidify in a physical form suitable for grinding and sizing. The desired additive(s) are added to the melt, prior to cooling, with agitation to yield the uniform homogeneous mixture.

More specifically, and in accordance with a first embodiment of the present invention, a tumbling bed of urea and additives(s) is preheated to a temperature approaching the melting point of urea. Molten urea is then metered and sprayed onto the moving particles. As the urea solidifies it acts as a binder incorporating the solid particles into homogeneous granules (which as stated may be urea of urea plus one or more desired additives including a calcium source, such as $CaCo_3$, $Ca(OH)_2$, $CaSO_4$, etc.; a phosphorus source, i.e., dicalcium phosphate, monocalcium phosphate, ammonium phosphate, sodium polyphosphate, defluorinated phosphate rock, etc.; a trace mineral mixture comprising e.g., zinc sulfate, manganese sulfate, copper sulfate, etc.; and a vitamin premix including e.g., a mixture of vitamins $A_1$ $D_2$ and E). The product is classified to the desired particle size with the fines and ground oversize being recycled to the process.

In accordance with a second particularly advantageous embodiment, the urea is prepared in a molten state and the desired additive(s) added to the melt with agitation to yield a uniform mixture. The melt is then poured onto a cooled surface, e.g., water cooled rolls, where the melt solidifies. Upon cooling the solidified material is crushed and screened to the desired particle size range.

Turning now to the drawings in detail, and first to FIG. 1, there is known a suitable arrangement of apparatus for carrying out a first, particularly advantageous method embodiment of the invention. In FIG. 1, particulate urea and one or more desired additives are introduced into a hollow rotatably mounted drum or cylinder 1 through a suitable screw or other conventional feeding means 2. The drum or cylinder 1, which includes an inlet end 3 and an outlet end 4, is mounted on rollers (not shown) and equipped with means generally shown at 5, for rotating the drum at a constant speed If required, the drum may be tilted to improve the flow of the solids under treatment toward the outlet end 4.

The particulate urea and desired additives, which are introduced through the screw 2, are preheated to a temperature approaching the melting point of urea, by conventional means, such as heat exchanger 8 or by way of a horizontal gas burner (not shown) mounted inside the drum 1.

Again with reference to FIG. 1, particulate urea (which may be prills or crystals) is introduced into a melt tank 10 through an appropriate screw 11. In general, the melt tank 10 is provided with heating means, such as a coil 12, and an agitator 13 driven by means (not shown) as is well known in the art. Steam (or any other suitable heating fluid) is introduced into the coil 12 to form the molten mass of urea.

In operation, the molten urea from the melt tank 10 is metered onto the tumbling bed of the preheated urea and additive(s) mixture, through a spray head or nozzle 15. Various types of spray nozzles, such as employed in a urea prill tower, may be used to effect a uniform distribution or coating of the molten urea over the preheated solids.

As the molten urea is metered onto the moving particles, the urea solidifies and acts as a binder incorporating the solid particles into homogeneous granules. The solids or granules pass gradually toward the outlet end 4 of the drum and into a screening apparatus 20, wherein the product of the desired particle size is recovered. As shown in FIG. 1, the oversize and undersize material is preferably recycled to the inlet end of the drum 1. The oversize should be crushed prior to its being recycled into the drum. The oversize and undersize material may be recycled into the melt tank 10, instead of being fed directly into the rotary drum. However, a continuous reheating or melting of the urea may result in the formation or breakdown of the urea into undesirable compounds, e.g., cyanuric acid or ammelide.

As is well known in the art, the depth of the solids in the rotary drum may be regulated by a baffle or so-called ring dam (not shown) positioned at the discharge or outlet end 4 of the drum 1.

Turning now to FIG. 2, there is shown a second, particularly advantageous, embodiment of the present invention. In this embodiment, urea is first prepared in a molten state in a melt tank 30, which similarly as in the embodiment illustrated in FIG. 1, includes heating means, such as a steam coil 31, and an agitator 32. The urea is heated to form a molten mass and the desired additives are added, with agitation, to yield a uniform blend or mixture. The melt is then permitted to cool, as by spraying the melt onto a cooled surface, such as the water cooled rotary drum 35, shown in FIG. 2. The solidified melt is crushed, by a crunching roller 36, and sized in a screening apparatus to the desired particle size. Crushed oversize and undersize are recycled to the system.

It may be noted here that the instant invention, as illustrated in the embodiments of FIGS. 1 and 2, affords many unique advantages over prior known methods. First, in the embodiment of FIG. 1, the urea and additives are thoroughly mixed and preheated to a temperature just below that of the melting point of urea. In this manner, the surface temperature of the particulate urea is high enough to incipiently fuse the surfaces thereof, thus causing agglomeration to occur as the particles are initially fed to the rotating drum. Thereafter, further and complete granulation is effected by spraying molten urea onto the said particles. That is, as the molten urea solidifies it acts as a binder incorporating the solid, partially agglomerated, particles into homogeneous granules.

In the embodiment of FIG. 2, the combination of the melt tank plus cooling and crushing rollers involves a minimum of equipment, ease of operation etc., and is easily adapted for other continuous or batch operation, depending upon output requirements, economics, etc.

The following examples will further serve to illustrate the present invention but are not intended to limit it thereto. Unless otherwise indicated, all parts are parts by weight.

EXAMPLE 1

In this example, the equipment used was substantially as shown in FIG. 1. The dimension of the rotary drum or cylinder was about 4'—0" x 8'—0" in lentgh.

A mixture comprising 15 parts urea, 10 parts dicalcium phosphate, 10 parts calcium carbonate and 3 parts trace mineral premix (comprising 22.13% zinc sulfate, 2.04% cobalt sulfate, 31.23% manganese sufate, 36.25% magnesium sullfate, 2.04% copper sulfate, 6.11% iron and sulfate and 0.20% ethylenediamine dihydroiodide), were supplied continuously to the screw conveyor 2, which was set to regulate the feed of the mixture into the drum 1 (rotating at approximately 10 rev./min.) at about 600 #/hour. The mixture was preheated in the jacketed screw conveyor 2 to a temperature approaching the melting point of urea (melting point, ca. 133° C.) so that the surface temperature of, at least, a portion of the urea particles was high enough to incipiently fuse the surfaces thereof as they were fed into the rotating drum 1. Urea prills, analyzing at about 1.2% biuret and containing about 0.3% moisture, were heated in the melt tank 10 to form a molten mass which was uniformly metered onto the solid cascading particles. As the particles passed through the rotating drum they were cooled and solidified into homogeneous particles. The product issuing from the outlet end 4 of the rotating drum was screened in a conventional vibrating screening device 20, to a particle size in the range of from 8–20 mesh. The fines or the material passing through the 20 mesh screen was recycled to the rotary drum. The oversize particles (retained on the 8 mesh screen) were crushed, and recycled to the rotary drum. The product, i.e., the material passing the 8 mesh screen and retained on the 20 mesh screen, was bagged at about 82° C. Several bags (picked out at random) were selected for testing to determine the caking tendency of the product. The warehouse stack test was used for this purpose, inasmuch as this test substantially approaches actual field storage conditions. In this test, the product to be tested is bagged (ca., 100 lbs. per bag) and the test bags are placed horizontally on a wooden pallet of the type normally used for commercial warehouse storage.

The pallet of test material is then placed in warehouse storage, and weight is added by stacking two full pallets of commercially bagged product on top of it. The test pallet is stored in this condition for 28 days. At the end of the 28 days' storage period, the test bags are carefully removed from the pallet and each is dropped once from a height of about 2 feet to separate any loosely held agglomeration of particles that may have formed during storage. Each bag is opened at one end, and its content is poured onto a 2 mesh screen which retains any lumps of caked material that may have formed. The lumps are retrieved and weighed. The weight, in pounds, of cake retained on the 2 mesh screen constitutes a quantitative measure of the caking tendency of the product being tested.

At the end of the 28 day stacking period, about 0.1–0.4 lb. (average 0.25 lb.) of the product from each bag was retained on a 2 mesh screen. This result shows that the above-described treatment substantially reduced the caking tendency of the urea-plus-additive composition of this invention.

EXAMPLE 2

In this example, the equipment used was substantially as shown in FIG. 2. Urea prills (1.2% biuret and 0.3 moisture as per Example 1) were heated in the melt tank 30 to form a molten mass. Approximately 20 parts of a dicalcium phosphate-monocalcium phosphate mixture; 15 parts calcium carbonate and 5 parts trace mineral premix (as per Example 1) were added to the molten urea. The hot mass was agitated to yield a uniform blend which was sprayed onto the rotating water cooled roller 35. The melt solidified on the surface of the roller 35 and was crushed by way of the crushing roller 36. The crushed material was screened in the screening apparatus beneath the roller 35 and 36 and fines and oversize material were recycled to the melt tank 30. A sample of the product, having a particle size in the range of from 8–20 mesh was tested in accordance with the warehouse stack test, as described in detail in Example 1. At the end of the 28 day stacking period, about 0.1–0.5 lb. of the product was retained on a 2 mesh screen.

While particularly advantageous embodiments of the invention have been described and illustrated by examples, it will be recognized by those skilled in the art that various changes and modifications can be made therein without departing from the scope of the invention as defined by the appended claims.

What is claimed is:

1. A continuous process for preparing a homogeneous silage additive, containing urea and one or more desired additives, said process comprising the steps of; mixing urea and an additive selected from the group consisting of a calcium source, a phosphorus source, trace minerals, vitamins and mixtures thereof; heating the mixture containing said urea and additive to the incipient fusion temperature of the urea; continuously introducing said mixture into an agitating device; continuously agitating said mixture thereby incipiently fusing at least a portion of the surface area of the said urea; continuously spraying molten urea onto said agitating mixture; continuously transferring the mixture, coated with said molten urea, into a zone of cooler temperature thereby solidifying said molten urea to bind the mixture into homogeneous granules; continuously withdrawing said granules from said agitating device; and screening the granules to obtain a product of desired size.

2. A continuous process for preparing a substantially free-flowing, non-caking silage additive comprising urea and one or more desired additives, said process comprising the steps of; forming a tumbling bed of urea particles in admixture with an additive selected from the group consisting of a phosphorus source, a calcium source, trace minerals, vitamins and mixtures thereof; preheating the mixture to a temperature approaching the melting point of the urea particles; metering molten urea onto said preheated moving particles thereby coating the mixture; cooling and solidifying the coated particles to form homogeneous granules by passing said particles through a cooling zone within said tumbling bed; removing said homogeneous granules from said tumbling bed and screening the removed granules to obtain a product of desired size.

3. A process for preparing a substantially free flowing and non-caking granular material having particular utility in preserving and increasing the nutritive value of ensilage, said pricess comprising the steps of; forming a homogeneous mixture of urea particles and an additive selected from the group consiting of a phosphorus source, a calcium source, trace minerals, vitamins and mixtures thereof, preheating said mixture to a temperature approaching that of the melting point of the urea particles, continuously charging said homogeneous mixture into a rotatable chamber; rotating said chamber to form a tumbling bed of said homogeneous mixture; forming a hot melt of urea and spraying said hot melt onto the tumbling bed of said homogeneous particles; continuing rotation until substantially all of the particles having passed the said spray of hot melt of said urea thereby coating the mixture, cooling the coated mixture to form homogeneous granules, and sizing said granules to produce a uniformly sized product.

References Cited

UNITED STATES PATENTS

| | | | |
|---|---|---|---|
| 2,346,072 | 4/1944 | Haskell et al. | 99—8 |
| 3,123,637 | 3/1964 | Lard et al. | 260—555 |
| 3,180,735 | 4/1965 | Titus | 99—2 |
| 3,322,827 | 5/1967 | James | 260—555 |
| 3,398,191 | 8/1968 | Thompson et al. | 260—555 |
| 3,443,956 | 5/1969 | Muller et al. | 99—2 |

RAYMOND N. JONES, Primary Examiner

R. M. ELLIOTT, Assistant Examiner

U.S. Cl. X.R.

99—2; 71—64DA, 64DB; 260—555C